(12) United States Patent
Dvorak

(10) Patent No.: US 7,523,048 B1
(45) Date of Patent: Apr. 21, 2009

(54) MULTIPURPOSE PRESENTATION DEMAND CALENDAR FOR INTEGRATED MANAGEMENT DECISION SUPPORT

(75) Inventor: Robert E. Dvorak, Atherton, CA (US)

(73) Assignee: Bluefire Systems, Inc., San Francisco, CA (US)

( * ) Notice: Subject to any disclaimer, the term of this patent is extended or adjusted under 35 U.S.C. 154(b) by 1007 days.

(21) Appl. No.: 09/766,539

(22) Filed: Jan. 19, 2001

(51) Int. Cl.
*G06F 17/30* (2006.01)
(52) U.S. Cl. ...................................................... 705/10
(58) Field of Classification Search ...................... 705/8, 705/10, 28
See application file for complete search history.

(56) References Cited

U.S. PATENT DOCUMENTS

| | | | | |
|---|---|---|---|---|
| 4,737,910 | A * | 4/1988 | Kimbrow | 705/28 |
| 5,168,445 | A | 12/1992 | Kawashima et al. | |
| 5,596,493 | A | 1/1997 | Tone et al. | |
| 5,712,985 | A | 1/1998 | Lee et al. | |
| 5,819,232 | A * | 10/1998 | Shipman | 705/8 |
| 5,953,707 | A * | 9/1999 | Huang et al. | 705/10 |
| 5,966,695 | A | 10/1999 | Melchione et al. | |
| 6,151,582 | A * | 11/2000 | Huang et al. | 705/8 |
| 6,216,109 | B1 * | 4/2001 | Zweben et al. | 705/8 |
| 6,249,774 | B1 * | 6/2001 | Roden et al. | 705/28 |
| 6,341,269 | B1 * | 1/2002 | Dulaney et al. | 705/22 |
| 6,370,509 | B1 * | 4/2002 | Ross et al. | 705/1 |
| 6,434,544 | B1 | 8/2002 | Bakalash et al. | |
| 6,493,678 | B1 | 12/2002 | Foster et al. | |
| 6,510,420 | B1 | 1/2003 | Cessna et al. | |
| 6,609,101 | B1 * | 8/2003 | Landvater | 705/10 |
| 6,834,266 | B2 | 12/2004 | Kumar et al. | |
| 6,996,538 | B2 * | 2/2006 | Lucas | 705/28 |
| 2001/0047293 | A1 * | 11/2001 | Waller et al. | 705/10 |
| 2002/0099597 | A1 * | 7/2002 | Gamage et al. | 705/10 |

(Continued)

FOREIGN PATENT DOCUMENTS

WO    WO 90/04827    *  5/1990

(Continued)

OTHER PUBLICATIONS

Screenshots, www.grossprofit.com, Oct. 18, 2000 [retrieved Sep. 9, 2004], pp. 1-9, retrieved from: archive.org and google.com.*

(Continued)

*Primary Examiner*—Romain Jeanty
(74) *Attorney, Agent, or Firm*—Ernest J. Beffel, Jr.; Haynes Beffel & Wolfeld LLP

(57) ABSTRACT

Aspects of the present invention include improvements to a management decision support system. Before improvement, the system includes a computer system having memory and resources, a retail demand forecasting program applying one or more forecasting approaches, running on the computer system and utilizing the output, said analysis programs generating at least one of (a) order of goods from a supplier-related data, (b) allocation of the goods to be shipped by the supplier-related data, or (c) distribution of goods to selling locations-related data. The improvements, according to one aspect of the invention, include a causal calendar utilized by the forecasting program to generate the output, the calendar including certain attributes for a plurality of events, and an analysis program to generate open to buy reports. Other aspects of the present invention are described in the specification, drawing and claims.

30 Claims, 7 Drawing Sheets

U.S. PATENT DOCUMENTS

| | | | |
|---|---|---|---|
| 2002/0128890 A1* | 9/2002 | Dick et al. | 705/8 |
| 2002/0133385 A1* | 9/2002 | Fox et al. | 705/7 |
| 2002/0147630 A1 | 10/2002 | Rose et al. | |
| 2003/0074251 A1 | 4/2003 | Kumar et al. | |
| 2003/0229502 A1 | 12/2003 | Woo | |

OTHER PUBLICATIONS

Koloszyc, Ginger, "Merchants Try Complex Math Tools to Improve Inventory Decisions", Stores Magazine, Nov. 1998 [retrieved Sep. 9, 2004], pp. 1-3, retrieved from: Archive.org and Google.com.*

Ackerman, Jerry, "Looking Back to Fashion's Future", The Boston Globe, Oct. 7, 1998 [retrieved Sep. 9, 2004], pp. 1-3, retrieved from: Google.com and archive.org.*

The SPAR Group, Inc., "SPAR: Merchandising, Information Services and Research", www.sparinc.com, Oct. 6, 1999 [retrieved Apr. 22, 2005], pp. 1-11, retrieved from: Google.com and archive.org.*

Display Unlimited, www.displayunlimited.com, May 19, 2000 [retrieved Feb. 2, 2006], pp. 1-7, retrieved from: Google.com and archive.org.*

Koloszyc, Ginger, "Merchants try Complex Mathematical Tools to Improve Inventory Decisions", Stores Magazine, Nov. 1998 [retrieved Mar. 29, 2007], pp. 1-3, retrieved from: archive.org.*

Higgins, Kevin T., "Space Management in the 1990s", Building Supply Home Centers, Oct. 1989 [retrieved Feb. 14, 2008], vol. 157, No. 6, pages , retrieved from: Dialog, file 148.*

Yang, Ming-Hsein, et al., "A study on shelf space allocation and management", International Journal of production Economics, 1999 [retrieved Feb. 14, 2008], pp. 309-317.*

Urban, Timothy L., "An Inventory Approach to Product Assortment and Shelf-Space Allocation", Journal of Retailing, 1998 [retrieved Feb. 14, 2008], pp. 15-35.*

Garry, Michael, "Making Space Management Work", Progressive Grocer, May 1991 [retrieved Feb. 14, 2008], 11 pages, vol. 70, No. 5, retrieved from: Dialog, file 15.*

"ACNielsen Launches New Version of Shelf Builder", PR Newswire, Sep. 23, 1997 [retrieved Feb. 14, 2008], 5 pages, retrieved from: Dialog, file 621.*

Robins, Gary, "Softlines, the new frontier in space management systems", Stores, Apr. 1993 [retrieved Feb. 14, 2008], 7 pages, vol. 75, No. 4, retrieved from: Dialog, file 15.*

Hauge et al., "*How Low Can You Go? Using Simulation to Determine Appropriate Inventory Levels*", attributed to IIE Lean Management Solutions, Sep. 23-24, 2002, Seattle, WA, (publication data unverified) <http://www.novasim.com/downloads/How%20Low%20Can%20You%20Go.pdf>, accessed Jan. 10, 2005.

Kumar, Mahesh et al., Clustering Seasonality Patterns in the Presence of Errors, Paper 155, May 2002, http://ebusiness.mit.edu.

Kumar, Mahesh, Error-based Clustering and Its Application to Sales Forecasting in Retail Merchandising, Sep. 2003, Massachusetts Institute of Technology.

Lin et al., "*Extended-Enterprise Supply-Chain Management at IBM Personal Systems Group and Other Divisions*", Interfaces 30:1, pp. 7-25, at pp. 12-13 (Jan.-Feb. 2000) available at <http://www.interfaces.smeal.psu.edu/pdf/v30n1a2.pdf>.

Montgomery, Alan, The Implementation Challenge of Pricing Decision Support Systems for Retail Managers, Oct. 2003, Pittsburgh, PA.

Sen, Alper, The U.S. Apparel Industry, Apparel Review, Oct. 2004, Dept. of Industrial Engineering, Bilkent Univ., Bilkent, Ankara, Turkey.

* cited by examiner

FIG. 5

| Item Identifier 505 | Location Identifier 525 | Presentation Quality 508 | Start Date 502 | End Date 503 |
|---|---|---|---|---|
| 921 | 301 | 5 | 10/12/2000 | 11/1/2000 |
| 921 | 302 | 6 | 10/12/2000 | 11/1/2000 |
| 921 | 303 | 8 | 10/12/2000 | 11/1/2000 |
| 921 | 304 | 5 | 10/12/2000 | 11/1/2000 |
| 921 | 305 | 5 | 10/12/2000 | 11/1/2000 |
| 922 | 301 | 8 | 10/12/2000 | 11/1/2000 |
| 922 | 302 | 9 | 10/12/2000 | 11/1/2000 |
| 922 | 303 | 11 | 10/12/2000 | 11/1/2000 |
| 922 | 304 | 8 | 10/12/2000 | 11/1/2000 |
| 922 | 305 | 8 | 10/12/2000 | 11/1/2000 |
| ⋮ | ⋮ | ⋮ | ⋮ | ⋮ |
| 102490 | 305 | 15 | 2/9/2001 | 3/1/2001 |

FIG. 6

| Item Identifier 505 | Location Identifier 525 | Date Range Identifier | | |
|---|---|---|---|---|
| | | 10/12/2000-11/1/2000 508 | 11/2/2000-11/14/2000 | 11/15/2000-11/24/2000 |
| 921 | 301 | 5   606 | 10 | 12 |
| 921 | 302 | 6 | 11 | 9 |
| 921 | 303 | 8 | 13 | 11 |
| 921 | 304 | 5 | 10 | 15 |
| 921 | 305 | 5 | 10 | 12 |
| 922 | 301 | 8 | 13 | 18 |
| 922 | 302 | 9 | 14 | 19 |
| 922 | 303 | 11 | 16 | 18 |
| 922 | 304 | 8 | 13 | 23 |
| 922 | 305 | 8 | 13 | 11 |
| ⋮ | ⋮ | ⋮ | ⋮ | ⋮ |
| 102490 | 305 | 15 | 20 | 31 |

| Fixture Identifier | Item Identifier | Date Range Identifier | | |
| --- | --- | --- | --- | --- |
| | | 10/12/2000-11/1/2000 | 11/2/2000-11/14/2000 | 11/15/2000-11/24/2000 |
| table 1 | 921 | 5 | 10 | 12 |
| table 1 | 922 | 3 | 8 | 6 |
| ⋮ | ⋮ | ⋮ | ⋮ | ⋮ |
| table 1 | 102490 | 8 | 12 | 22 |
| table 1a | 921 | 6 | 11 | 9 |
| table 1a | 922 | 3 | 8 | 13 |
| ⋮ | ⋮ | ⋮ | ⋮ | ⋮ |
| table 1a | 102490 | 15 | 20 | 31 |
| table 2 | 921 | 8 | 13 | 11 |
| table 2 | 922 | 3 | 8 | 13 |
| ⋮ | ⋮ | ⋮ | ⋮ | ⋮ |
| table 2 | 102490 | 15 | 20 | 31 |
| ⋮ | ⋮ | ⋮ | ⋮ | ⋮ |
| wall 56 | 921 | 6 | 11 | 13 |
| ⋮ | ⋮ | ⋮ | ⋮ | ⋮ |
| wall 56 | 102490 | 15 | 20 | 31 |

750

| Location Identifier | Fixture Identifier |
| --- | --- |
| 301 | table 1 |
| ⋮ | ⋮ |
| 301 | wall 56 |
| ⋮ | ⋮ |
| 305 | wall 56 |

751

| Location Identifier | table 1 | table 1a | table 2 | ... | wall 56 |
| --- | --- | --- | --- | --- | --- |
| 301 | 1 | 0 | 0 | ... | 1 |
| 302 | 0 | 1 | 0 | ... | 1 |
| 303 | 0 | 1 | 1 | ... | 0 |
| 304 | 0 | 1 | 0 | ... | 1 |
| 305 | 0 | 0 | 0 | ... | 0 |

809A — Fixture Identifier: table 1 — 520 /606

| Item Identifier | 10/12/2000-11/1/2000 | 11/2/2000-11/14/2000 | 11/15/2000-11/24/2000 |
|---|---|---|---|
| 921 | 5 ←508 | 10 | 12 |
| 922 | 3 | 8 | 6 |
| ⋮ | ⋮ | ⋮ | ⋮ |
| 949 | 8 | 12 | 22 |

809B — Fixture Identifier: table 1a

| Item Identifier | 10/12/2000-11/1/2000 | 11/2/2000-11/14/2000 | 11/15/2000-11/24/2000 |
|---|---|---|---|
| 921 | 6 | 11 | 9 |
| 922 | 3 | 8 | 13 |
| ⋮ | ⋮ | ⋮ | ⋮ |
| 949 | 15 | 20 | 31 |

809C — Fixture Identifier: table 2

| Item Identifier | 10/12/2000-11/1/2000 | 11/2/2000-11/14/2000 | 11/15/2000-11/24/2000 |
|---|---|---|---|
| 921 | 8 | 13 | 11 |
| 922 | 3 | 8 | 13 |
| ⋮ | ⋮ | ⋮ | ⋮ |
| 949 | 15 | 20 | 31 |

809D — Fixture Identifier: wall 56

| Item Identifier | 10/12/2000-11/1/2000 | 11/2/2000-11/14/2000 | 11/15/2000-11/24/2000 |
|---|---|---|---|
| 102310 | 8 | 11 | 13 |
| ⋮ | ⋮ | ⋮ | ⋮ |
| 102490 | 15 | 20 | 31 |

750

| Location Identifier | Fixture Identifier |
|---|---|
| 301 | table 1 |
| ⋮ | ⋮ |
| 301 | wall 56 |
| ⋮ | ⋮ |
| 305 | wall 56 |

751

| Location Identifier | table 1 | table 1a | table 2 | ... | wall 56 |
|---|---|---|---|---|---|
| 301 | 1 | 0 | 0 | ... | 1 |
| 302 | 0 | 1 | 0 | ... | 1 |
| 303 | 0 | 1 | 1 | ... | 0 |
| 304 | 0 | 1 | 0 | ... | 1 |
| 305 | 0 | 0 | 0 | ... | 0 |

FIG. 9

MULTIPURPOSE PRESENTATION DEMAND CALENDAR FOR INTEGRATED MANAGEMENT DECISION SUPPORT

RELATED INFORMATION

This application is related to application Ser. No. 09/708,944; filed 8 Nov. 2000 entitled Method and Apparatus for Distribution of Fashion and Seasonal Goods by Inventor Robert Dvorak and related to application Ser. No. 09/760,377; filed 12 Jan. 2001 entitled Multipurpose Causal Event Calendar For Integrated Management Decision Support by Inventors Robert Dvorak and Kevin Katari. The two related applications are hereby incorporated by reference.

BACKGROUND OF THE INVENTION

Retail management is often responsible for sale of goods from a plurality of selling locations. Refined management decision support is useful in making a variety of decisions involving goods. Reports that support management decisions may cover ordering, allocation of ordered goods being delivered by a supplier, distribution of goods to selling locations, open to buy management, markdown management, bottom-up and top-down planning. These reports, available on-line, by e-mail or in hard copy, present forecasted results. The results may also be electronically or otherwise transferred to operational and financial systems including systems that order goods or direct goods from on place to another within a retailer.

Influences on forecasting include quantities of goods to be displayed at selling locations. However, management support systems generally do not have a presentation demand calendar which allows a computer system to automatically factor in the effects of past and future events, when generating management decision support reports. Moreover, integrated systems covering the full range of management decision support are virtually unheard of in retail sales management.

Managing visual presentation of products in selling locations is useful. Retailers invest significantly in building fixtures in selling locations and determining the best visual presentation of products for sale (e.g., how much of each good should be displayed). In many cases, careful thought is given to where in a selling location a product is featured as well as the quantity of the product that will be most appealing visually to customers. Some retailers have visual departments responsible for planning the layouts of their selling locations, determining which products are sold on which fixtures as well as the ideal display quantity of the product.

Operational management required to support visual presentations is very complex and often is ineffective or inefficient. Presentation requirements may be poorly executed for a variety of reasons. First, maintenance of data reflecting the presentation demand requirements is complex given a range of items, locations, and time periods. Second, presentation requirements come in a variety of different forms. Third, the presentation requirements affect a number of decisions up the supply chain at different points in time. Presentation demand requirements are typically not integrated with the operational systems for ordering, allocating, distributing, marking down, managing OTB, promotional or forward buying and planning. Instead, retailers manage presentation quantities through user intervention and changes to orders or distributions or planned values exceed economic order requirements at some aggregate level.

Thus, it is desirable to improve management decision support systems, utilizing a presentation quantity calendar to as a basis for a variety of management decision support reports and operational decisions.

SUMMARY OF THE INVENTION

Aspects of the present invention include improvements to a management decision support system. Before improvement, the system includes a computer system having memory and resources, a retail demand forecasting program applying one or more forecasting approaches, running on the computer system and utilizing the output, said analysis programs generating at least one of (a) order of goods from a supplier-related data, (b) allocation of the goods to be shipped by the supplier-related data, or (c) distribution of goods to selling locations-related data. The improvements, according to one aspect of the invention, include a presentation demand calendar utilized by the forecasting program to generate the output, the calendar including certain attributes for a plurality of events, and an additional analysis program to generate open to buy reports. Other aspects of the present invention are described in the specification, drawing and claims.

BRIEF DESCRIPTION OF THE DRAWING

FIGS. 5-6 depict tables.

FIGS. 5-6 depict alternative tables that associate presentation quantities with a good at a selling location.

FIGS. 7-9 depict tables that can be used with display fixtures to associate presentation quantities with a good at a selling location.

DETAILED DESCRIPTION

Figure 1:
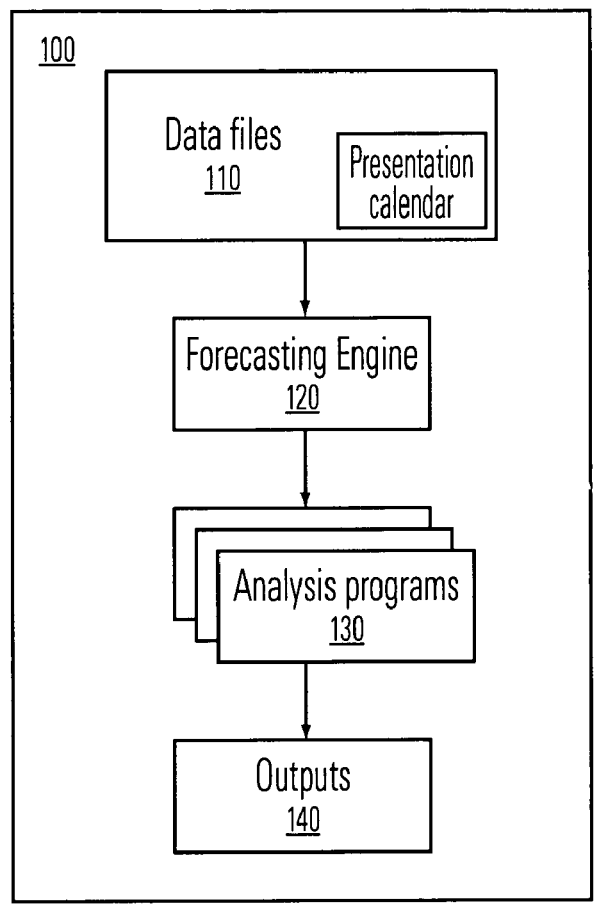
FIG. 1 is a high level block diagram of a system including a presentation calendar and one or more analyses providing input to an additional process.

The following detailed description is made with reference to FIG. 1. Preferred embodiments are described to illustrate the present invention, not to limit its scope, which is defined by the claims. Those of ordinary skill in the art will recognize a variety of equivalent variations on the description that follows.

FIG. 1 is a block diagram of a system practicing aspects of the present invention. A computer system 100 may include one or more computers or servers, having memory and resources for storing data and running analysis programs. The system 100 hosts data files 110, a forecasting engine 120 or engines, analysis programs or modules 140, and output devices. Among the data file 110 is a presentation file, as described below. The forecasting engine 120 or engines can apply one or more forecasting approaches. For instance, it can operate on daily or more frequent data or on weekly or monthly data. Individual goods or groups of goods can be forecast, either for individual selling locations or groups of selling locations. Different approaches to forecasting include trending sales during this selling period (such as a year); trending sales for this selling period versus the a prior selling period (such as the same period last year); moving average forecasts, with or without exponential smoothing to reduce the effect the effect of outliers; time series forecasts; probabilistic sales forecasts; auto regressive integrated moving average forecasts; etc. The type of forecast made is not the subject of this invention, rather improving management decision support by factoring presentation quantities into forecasts for inventory levels required in a number of different manners and generating a plurality of management decision support reports utilizing the same presentation manager.

The forecasting engine 120 generates output which is used as input to a plurality of analysis programs 130. Analyses which may have been performed by an integrated system in the past include ordering of goods from a supplier, allocation of the good among destination when they are ready to be shipped by the supplier (sometimes called post-allocation), and distribution of the good from one location to another. In accordance with the present invention, the presentation manager provides information for forecasting inventory requirements which, in turn is used by some or all of the previously available analyses and also by analyses which did not, before this invention, utilize a presentation manager or use the presentation manager output in the manners described below. The additional analyses include open to buy, markdown management, promotional buying forward buy and bottom-up planning decisions and reports. Analysis programs produce outputs 140 which are human or machine readable. These outputs may include a display on a monitor in communication with the computer system, a spreadsheet file which can be called up and reviewed by a user, a printed report on paper, microfiche or optical media (e.g., CD-ROM, CD-R, CD-RW, DVD, etc.) In addition, or alternatively, an analysis can be sent from one system to another (e.g., data sent to warehousing management system or a suppliers orders system). The analysis or outputs may be automatically routed by e-mail. Machine readable outputs, for instance, for ordering, may be machine readable inputs to other program modules or systems which take action with or without user review or intervention, such as placing an order with a supplier.

A presentation demand calendar is a database table or set of tables in which presentation demand requirements are stored. Presentation demand requirements come in different forms. For example, regular presentation quantities (RPQs) are target inventories that selling may reduce below the target value. In some situations, where the presentation quantity is a target inventory that should be on hand in all but extremely high selling situations, sometimes called a presentation quantity protect (PQP). Special display minimum (SDM) presentation quantities are used for goods that will not be saleable during a presentation, such as goods placed in a window or special display, that will not be sold even if the selling location is otherwise out of the good. Another type of presentation demand requirement is an average presentation quantity (APQ). With an APQ, selling location inventory levels are managed to ensure that average store quantity on-hand of an item is intended to equal to the APQ or greater. For fashion or seasonal goods, is a Capped Presentation Quantity (CPQ) is sometimes used. This is actually a normally defined PQ to which differential math is applied over the presentation. This is done because typical fashion and seasonal programs have a short good life by the end of which the inventory levels that should reach zero. So if the PQ does not also reach zero by the end of the program, it may lead to an undesirable surplus of inventory. The overall presentation quantity for a good at a selling location may be made up of one or more of these presentation quantity types; the types of presentation used may also change from time to time.

The presentation demand event calendar table stores all of the good-presentation quantity information required to associate good-time periods for selling locations with presentation quantities. Typically, the presentation demand calendar would be configured with data fields or attributes that describe the presentation event.

Good Identifier: This field is populated with a unique identifier for the good in the event, typically a SKU number.

Selling Location Identifier: This field is populated with a unique identifier for the selling location of the event, typically a store number. Two fields may be used, to identify the selling location by number, such as a store number, and to describe its location, such as by city and shopping center. Alternatively, a selling location number may be associated with a selling location description stored in a separate table.

Quantities: One or more quantity fields can give presentation quantities for specific time periods. The time periods can be implicitly related to the memory location or array location where the quantity is stored. Alternatively, explicit start and stop dates for the presentation can be stored.

Start Date This field, when present, is populated with the start date of the presentation.

End Date This field is populated with the end date of the presentation.

Fixture Assignment: An alternative to assigning a presentation quantity, as a number, is to assign a fixture in which the good will displayed. This alternative applies when a fixture schedule is used, identifying types, quantities and capacities of fixtures at selling locations. Fixture assignments are associated with start and end dates, implicitly or explicitly, just as quantities are.

Presentation Type: This field is optionally populated with a code for or description for the presentation. When a code is used, a presentation description may be associated, from a separate table, with the type.

This logical table may be constructed from a number of physical tables, designed for easier user maintenance. The presentation demand calendar may be used on an exception basis to identify presentations with substantial impacts on other activities.

Presentation quantities can be assigned to key goods or goods being promoted, to ensure that there is sufficient inventory to support the desired visual presentations and projected selling of those goods. At the other end of the spectrum, presentation quantities can be said for every good by store group, where all stores in a store group have the same display fixtures. Visual presentation demand requirements may be accompanied by setup instructions for selling locations, which may be distributed to guide selling location personnel in presenting goods. In an integrated system utilizing the present invention, this logical table may be used as input to a forecasting engine, which uses one or more forecasting approaches. The output of the forecasting engine can be analyzed in many ways, such as for ordering, allocation, distribution, markdowns, open to buy, promotional planning, and forward buying planning. These analyses drive the inventory of goods available at selling locations and distribution centers. A multipurpose presentation demand calendar supports efforts of a retailer to generate good and selling location specific analyses.

Using a display fixture schedule is one way of reducing the workload for setting up presentation demand requirements. A display fixture schedule allows the user to associate presentation quantities with a good at a selling location. A display fixture schedule may include a fixture identifier, such as a unique name for particular fixture, promotional display point or other mode of presentation, (e.g., table 1 department A, rounder 5 department C or 4-way department G.) It also may include a capacity of the fixture. A set of named fixtures is then associated with each selling location, so that the quantity of each fixture at each selling location is specified. When the layout of selling location changes, different fixtures can be associated with the location. Through the presentation demand calendar, goods are assigned to fixtures for periods of time. The system takes into account the capacities of the display fixtures and the number of display fixtures at each selling location to calculate presentation demand quantities. For good-selling location pairs, more than one fixture at a selling location can contain the same good. Therefore, the total presentation quantity for a good at a selling location may be the sum of presentation quantities required for more than one display fixture. Using this approach, the system can calculate the presentation demand from fixture assignments for goods.

In practice, an array of memory positions in a presentation demand calendar may be associated with successive time periods. The start and end dates for these periods are implied from the position in which a presentation quantity or fixture assignment is stored. The start and end dates for successive time periods may define non-overlapping or overlapping periods of time.

There are a number of ways of associating presentation quantities with a good at a selling location. One of the simplest from a data perspective is to create a data table, see FIG. 5, from inputs that has the item identifier 505 and the location identifier 525 related to the presentation quantity 508 with an accompanying start date 502 and end date 503. However, while this satisfies all the data requirements it may not be the easiest approach for the user.

A potential improvement on entering the information would be to organize the data entry by date range periods with an identifier. This will require entry of the date ranges but then will streamline the data entry for each item and location combination, FIG. 6. So as shown in FIG. 6 while you will still enter in some manner the item identifier 505 and location identifier 525, which may be drop down menu or some way of entering more than one item and location identifier at once, you will then enter the presentation quantities 508 into date ranges.

Further improvements may involve adding fixtures that are then populated with items and then attributing the fixtures to the selling locations. How that might work is exampled in FIG. 7. The presentation quantities 508 can be populated for date range indicators 606 with an item identifier 505 and fixture identifier 720. The fixtures identifiers 720 are then attributed to the location identifiers 525 in one of a number of manners like that done in 750 or 751. By doing all of this you end up getting item and location time specified fixturing. Further improvements to this may include having the information entered in by fixture like in 809a, 809b, 809c and 809d in FIG. 8. Here the presentation quantities 508 can be populated for date range indicators 606 with an item identifier 505 for a fixture 720. Again the fixture to location attributing can be done in multiple manners such as 750 and 751 in FIG. 8.

Figure 9:
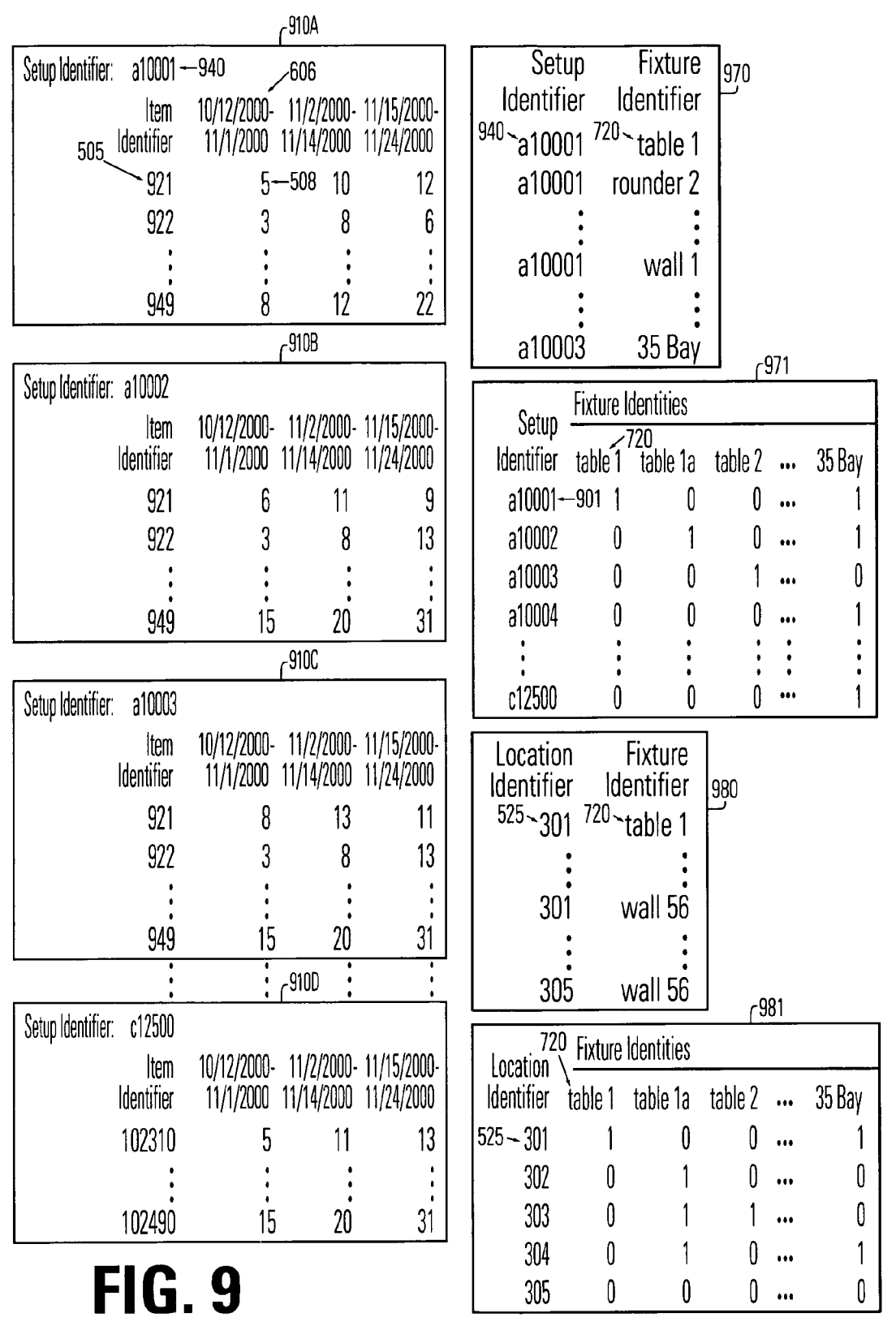

Further improvements exampled in FIG. 9 may involve adding setup identifiers that are then populated with presentation quantities 508 can be populated for date range indicators 606 with an item identifier 505 for a setup indicator 940. Here there would be multiple setups like 910a, 910b, 910c and 910d. The setup indicators would then be attributed to fixtures like in FIG. 9 in 970 or 971 where the setup indicators 901 and fixture identifiers 720 are attributed. Then the fixture indicators 720 are attributed to the location indicators 525 in one mode like in 980 or 981.

In any of the above approaches the system can calculate the presentation quantity for goods for particular locations for particular time periods. However, in some or all of the above methods it is possible that there are multiple presentation quantities per item and location pair for a given day, week or time period. This could result from an item being on multiple fixtures and/or on multiple setups at a selling location or may result because it is easier to input values in a way that results in multiple presentation values per location. It could also happen because there are overlapping time fixture, setup or otherwise time periods that result in an item for a location having multiple presentation quantities. Then to arrive at the presentation value that is typically passed to the other systems or system activities the multiple values are added together. In some cases it is useful for the other systems or system activities to get the fixture by fixture, set up by setup or other combination presentation values and use those values, so in that case the individual presentation values are sent. In some cases the other systems or systems activities want both the total presentation quantity and the individual fixture by fixture or other values from which they are derived.

The presentation demand calendar table serves as the single repository of presentation demand information feeding a range of retail systems or a range of different activities within a system, where the following could be separate systems or separate activities within a system.

Ordering: An ordering system or ordering activity within a system typically determines the quantity of a product that should be ordered from a distributor or manufacturer in order to meet expected sales with some additional allowance for safety stock. In calculating required order quantities, it is useful to understand the inventory requirements to support the selling and visual presentations desired in the selling locations. Because the presentation quantities entered into the presentation manager should affect the inventory required, it is helpful for the ordering system or activity to get this information from the presentation manager in order to make the most accurate determination of the order quantity. For example, if the presentations in the selling locations at the end of the order coverage cycle (i.e., the time period for which the orders must support the selling and inventory requirements of the selling locations) are higher or lower that should be factored into the order. If it is not then the likely desired presentation quantity may not be available in the selling location.

Allocating: An allocating system or allocating activity within a system typically determines the quantity of goods to be sent from a selling location that either does not stock goods or does not want to stock this good now to the selling locations that stock or use the good. In determining these quantities it is useful to understand the expected rate of future selling and inventory levels required for the goods that are being allocated. Because the presentation quantities entered into the presentation manager should affect the inventory required, it is helpful for the allocation system or activity to get this information from the presentation manager in order to make the most accurate determination of the allocation quantities. For example, if the presentation quantities for the set of locations served by one part of the allocation are higher than those in another part of the allocation, the former group of locations would expect to receive more goods if the presentation quantities are factored in. Therefore it is helpful for the allocation system or activity to get this information from the causal event calendar in order to make the most accurate determination of the allocation quantity.

Distributing: A distribution system or distribution activity typically determines the quantity of an good that should move from one stocking location to another stocking location, typically from a distribution center to a store. In calculating required distribution quantities, it is useful to understand the expected rate of selling and the inventory required in the location to which the good is being sent in order to determine the quantity that should be sent. Because the presentation quantities that are entered into the presentation manager identify changes in inventory required, it is helpful for the distribution system to get the causal presentation manager information in order to make the most accurate determination of the distribution quantity.

Associating respective presentation quantities, presentation dates and time elements with the good at the selling locations is usefully combined with looking forward and rolling up projected demand requirements, taking into account the presentation quantities and presentation dates. As explained above, looking forward means looking forward into the future from a particular look forward date. The date may be the date of the on hand inventory data, the date on which analysis is performed, a proposed date for a decision or action, or any other date related to the decision or action. The decision or action may involve ordering the good from a supplier, post allocating the supplier's delivery of the good, distributing the good among stocking and selling locations, determining the OTB, estimating the bottom up plan, determining the best markdown decisions and determining the best promotional or forward buy. The interval during which the presentation quantity affects the analysis is the time between when the inventory being examined will be available at the selling location. This interval is analyzed because it is when the presentation quantity supplied will impact the decision for which it is being included.

The presentations then may be identified in the presentation manager or in the system or system activities using the presentation manager as to their type (for example RPQ, PQP, SDM or APQ) and the mathematical mode of their usage. For example a presentation quantity may be used in different ways in basic item activities like ordering, allocating, distributing, OTB or planning than in the same activities for fashion or seasonal goods. The timeframes for which the presentation quantity values are used also vary by activity. To more fully describe this we will first example the timeframes used for each of the activities and then we will discuss the different mathematical modes for using the presentation quantities.

Figure 2:
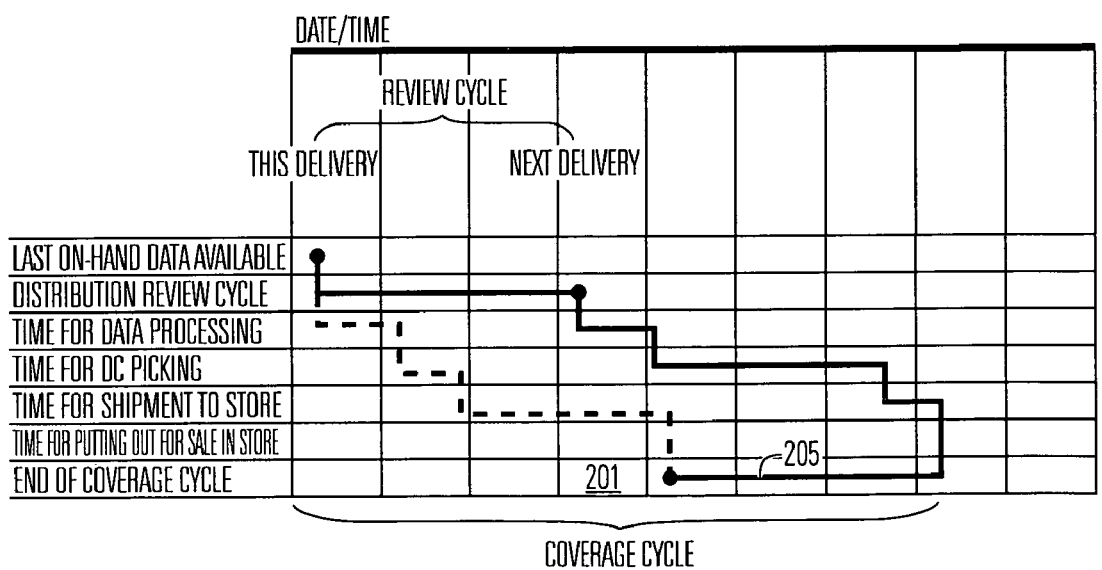
FIGS. 2-4 depict a coverage cycle, including a review cycle, for distribution from and through distribution and national distribution centers.

A distribution activity uses one or more of the presentation quantities in FIG. 2 during the time frame within the distribution coverage cycle 201 and more likely during the timeframe of when this delivery arrives at the selling location and is ready for sale through to when the next delivery arrives at the selling location and is ready for sales 205.

Figure 3:
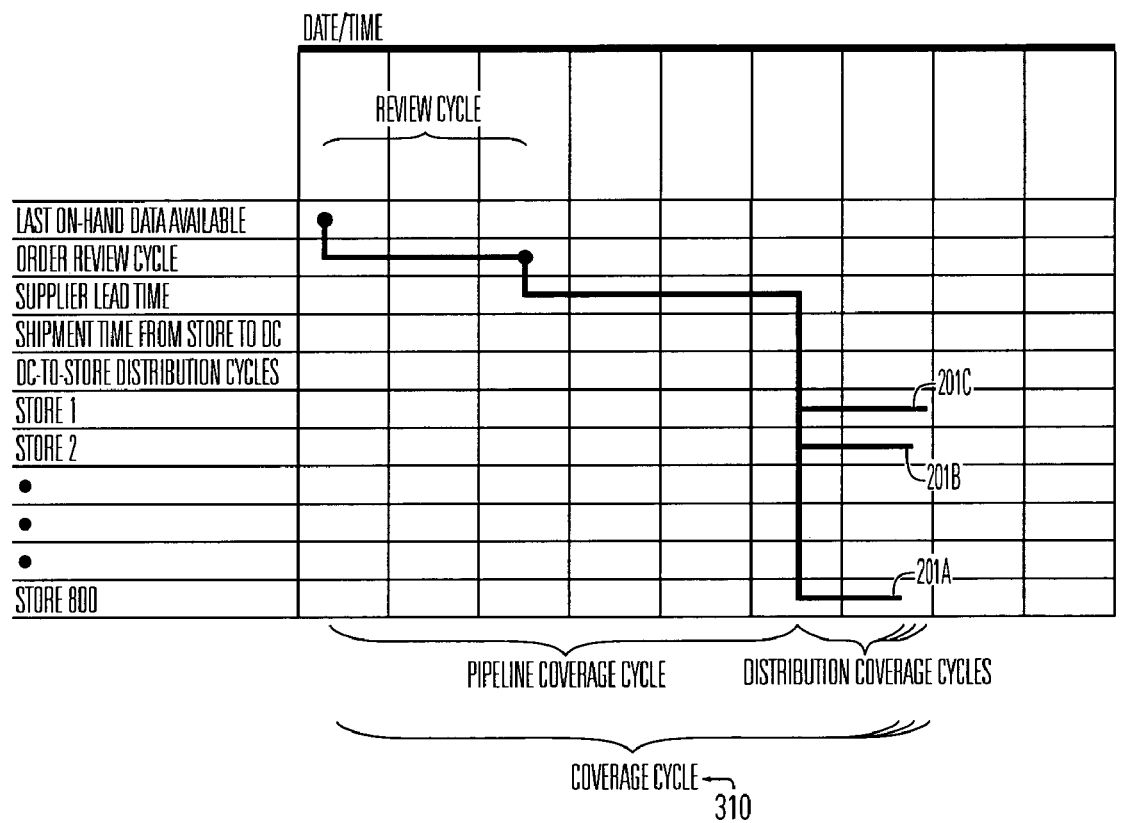

In a simple order activity you would use a presentation quantity or quantities during the specific coverage cycle that includes the selling location. In FIG. 3 that would be during the distribution cycles 201a, 201b and 201c. And more likely you would use a presentation quantity or quantities during the timeframe of when the deliveries supported by the order arrives at the selling location and is ready for sale through to when the next delivery arrives at the selling location and is ready for sales, which would be the equivalent of FIG. 2 205 for each of the distribution cycles, 201a, 201b and 201c in FIG. 3. In a more sophisticated version of ordering you might step day by day through the end of the total allocation cycle 310 using the presentation quantities for every day at the selling locations and therefore affecting what would be sent to those locations on a daily basis. The reason you would do this is that if there are large presentation quantities in early days that require sending quantities to particular locations, then you would want to factor these impacts into where the inventory is located and how much is needed. Frequently you run into situations where large presentation quantities that used during promotions, for display purposes, end up leaving selling locations overstocked. Unless these situations are factored in then you will understate the required orders to then support the locations that are not left overstocked.

Figure 4:
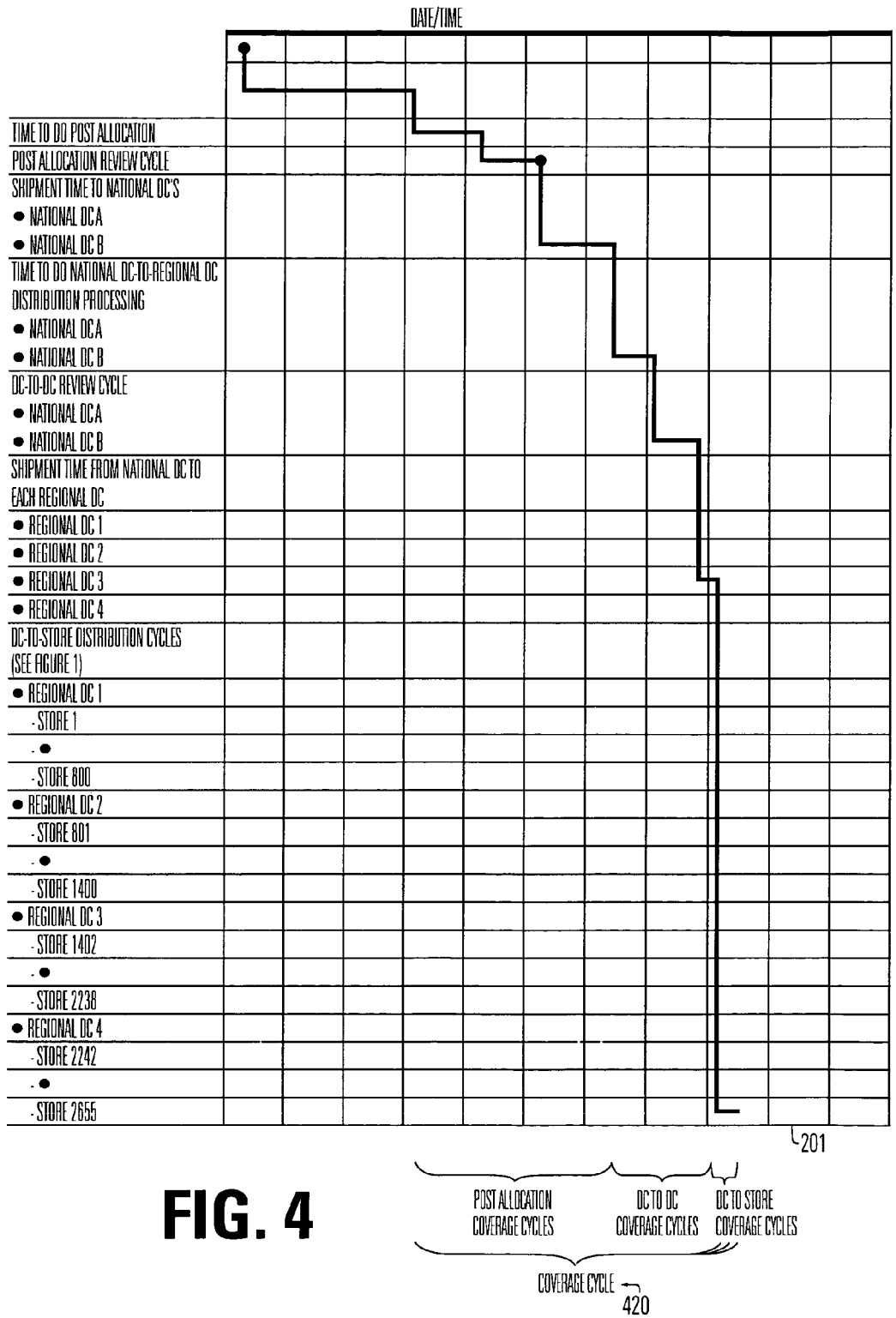

In an allocation activity you would use a presentation quantity or quantities during the specific coverage cycle that includes the selling location. In FIG. 3 that would be during 201 for each of the stores supported by the allocation. And more likely you would use a presentation quantity or quantities during the timeframe of when the deliveries supported by the allocation arrives at the selling location and is ready for sale through to when the next delivery arrives at the selling location and is ready for sales, which would be the equivalent of FIG. 2 205 for each of the distribution cycles, represented by the single cycle 201 in FIG. 4. In a more sophisticated version of allocation you might step day by day through the end of the total allocation cycle 420 using the presentation quantities for every day at the selling locations and therefore affecting what would be sent to those locations on a daily basis like we described above for ordering.

In an OTB activity you would use the presentation quantity or quantities to determine the inventory levels that are required to support the selling. It is very much like calculating what is going on during the order cycle and if the OTB period extends beyond the end of the order cycle for different items then an automated OTB very well may be running a number of successive order cycles. So in that case the OTB system or activities within a system would make use of many presentation quantities for each store and could use as many as multiple presentation quantities per item and location and date combination.

Markdown suggestions are most effectively done knowing where inventory is currently located or would be located in the future, if not all of the inventory has been shipped to the selling locations. So the markdown manager typically uses presentation quantities for dates after the date the markdown is being run and before the out date (i.e., the desired date of last sale) for the good being marked down.

Promotional buying or forward buying systems or activities within a system also are driven by what inventory levels are desired throughout and after the trade or consumer promotion. Since presentation quantities can be an important driver of inventory levels during and after promotions that information is important to understanding how much goods to buy for the promotion or forward buy. Thus these systems or activities within a system would benefit from getting presentation quantities from a presentation manager on dates after the current date and through the future dates through which the purchased inventory would be sold.

There are a number of ways that the presentation quantity gets factored into the activities. For example a distribution model stock can be calculated, taking into account presentation quantities, using either of the following equations:

ModelStock(selling location, good)=Maximum of
((PresentationQuantity(selling location, good, time), DemandProxy(selling location, good))+
SDM(selling location, good, time)

or,

ModelStock(selling location, good)=DemandProxy
(selling location, good)+PresentationQuantity
(selling location, good, time)+SDM(selling location, good, time)

If the first equation is used, the quantity available in the stocking location will be allowed to fall below the presentation quantity between receipt of distributions and so the presentations will be treated in the regular manner described before. If the second equation is used, the presentation quantity will be protected or capped (as described previously); the quantity available in the location should not typically fall below the specified presentation quantity between receipt of distributions except in the case of a fashion program selling well above its plan (described in more detail below). Variables in these equations include:

PresentationQuantity(selling location, good, time) of either regular (RPQ), average (APQ), protect (PQP) or capped (CPQ) types are determined using the approaches described below.

DemandProxy(selling location, good) may be a measure of projected demand requirement for the coverage cycle. It typically includes projected selling and safety stock forecasts. For the present invention, virtually any DemandProxy can be modified to reflect the real world consideration of presentation quantities; the manner in which the DemandProxy is calculated is not a part of the present invention. And fashion or seasonal demand proxies may be calculated in very different ways than basic item ones.

SDM(selling location, good, time), again, is a shorthand for "special display minimum." It is a user specified value that can be directly assigned. For instance, a SDM may be useful when using the first equation above and desiring to protect a special display quantity from being sold during the coverage cycle (such as an item in a display window that you are not willing to sell during the display period). It can also be used as an additional safety factor to cushion model stocks against problems of poor data integrity.

When the decision or action of concern involves a distribution, the model stock equations can be extended to calculate distribution quantities. One equation for this calculation is:

DistributionQuantity=ModelStock(selling location, good)−Onhand(selling location, good)−Intransit (selling location, good)

Variables in the equation include:

ModelStock(selling location, good) from prior equation (s).

Onhand(selling location, good) is the quantity of the good at the selling location, based on the available information.

Intransit(selling location, good) is the quantity of the good in-transit to the selling location. This quantity would include quantities already allocated but not picked, as well as quantities picked but not shipped, and quantities physically in-transit to the selling location.

From these equations above you can see how the presentation quantity gets used in determining the distribution quantities. It is useful to then keep in mind that the distribution quantity may then get adjusted by further factors such as minimum distribution quantities, shipment increment quantities (e.g., that shipments are in multiples of 120 but not in between), case pack quantities (e.g., shipments are in multiples of the physical shipment case) and distribution center stock availability (in the event of the total shipment desired for an good being more than the DC has available some logic is applied to send out the quantity available in the manner that will best support it going to the stores most likely to need it first). Application of any one of these may be as simple as any positive distribution quantity below the minimum distribution quantity gets moved up to the minimum distribution quantity or there may be logic that says anything below x percent of the minimum distribution quantity is rounded down to 0 and the rest are rounded up.

When the decision or action involves ordering goods, allocating goods, determining bottom up planning requirements, making OTB estimates or tradeoffs or making promotional or forward buys a similar factoring in methodology is utilized where the selling location demand proxy needs are compared to and/or combined with the presentation quantities to arrive at the model stocks. These model stocks are then factored into the orders, allocations, OTB inventory requirements, planning inventory requirements, promotional or forward buy quantities and markdown inventories.

For each of these situations, a particular presentation quantity determination type (e.g., RPQ, APQ, PQP or CPQ) including mode of incorporation into the model stocks and resulting forecasts of inventory and the timing of which PQ value during the period of concern will need to be selected, when there are a variety of presentation quantities within the period of concern.

As we have previously discussed the PQ can be additive to the demand proxy to arrive at the model stock or the model stock can be the maximum of the PQ and the demand proxy. If the PQ is in regular PQ mode then the maximum calculation approach is used for determining the model stock. If a PQ is in the PQ protect mode (RPQ) then the additive approach to calculating the model stock is used. You could elect to use either calculation approach with the average PQ (APQ) or the capped PQ (CPQ). PQs may also change over time for an item. For example, they may start as one type when the good is introduced and then change to another type later in the life of the good.

Fashion or seasonal items tend to use capped PQs because by the end of the product life it is usually desirable for the PQ value to reach zero (because the inventory level should reach zero). The capping approach can be done in a number of manners. One mode is to have an ideal PQ entered into the presentation manager and then to cap that number based on the remaining sales at a location after the end of the cycle for which the model stock is being calculated. Another mode is to base the capping on some fraction of the remaining sales, where that fraction may be a fixed number or may change overtime (in some instances it is desirable to have that fraction decrease as you get closer to the end of the product life). The capping could be a straight function of the amount of selling expected at a location. The capping could also be a function of the amount of time remaining in the life of the good or the fraction of the good life remaining. The capping could be a function of the amount of inventory expected to be sent to a selling location. It could also be some combination of remaining sales, total sales, inventory, good life or good remaining life.

In a the period of concern for determining the presentation quantity that may be a coverage cycle or part of a coverage cycle, there may be multiple different PQ values, for instance, when a presentational outsizing or placing items on multiple fixtures takes place during part but not all of the period of concern. In the case of multiple different PQs, a number of approaches can be taken to selecting a PQ to use. One option is to use the PQ for the location on the last day of the coverage cycle. This will ensure that you end up with the desired PQ factored in on the last day. Another option which generally results in higher stocking levels is to use the maximum value during the cycle. This is useful for a presentational event that is shorter than a review cycles. It covers the peak PQ value for the activity. Another option is to use the maximum value of the PQ within the dates between distribution coverage cycle end date and an earlier date reflecting the length of the distribution review cycle. This option delivers the maximum PQ value between when the current shipment or distribution arrives and when the next shipment arrives. Another option is to use the value on the date that the desired activity goods are received at the location. This date, if not otherwise indicated in the system, can be determined by subtracting the length of the distribution review cycle from the distribution coverage cycle end date. Yet another approach is to take the average PQ (APQ) over the time period of concern, whether it is an entire coverage cycle or a subset of one. This approach is neither of the more extreme numbers and can be preferred to safely cover a multitude of situations. Finally you may use a presentation quantity approach that looks at the values at the beginning and end of the period of concern and trends off of that. This can be used to try and respond to promotional peaks but not leave the full higher value at the end of the promotion. So if the PQs drop over the cycle the PQ used for the period is a mathematical weighting of the high and low quantities other than a straight average, where the high or the low number may be disproportionately weighted depending by whether it is first or last. So for example, the last number may be weighted 75% and the first PQ time wise weighted 25% in arriving at the PQ that gets used. Thus, a preferred PQ for a period of concern can be selected.

In an integrate system, presentation quantities can be taken into account in a variety of analyses, beyond ordering, allocating and distributing. For instance, analyses for bottom-up planning, promotional planning or forward buying, open to buy management and markdown management analyses can benefit from a multipurpose presentation demand calendar.

Bottom-up planning: Bottom-up planning provides good level plans for the future, typically providing sales, inventory, and receipt information on a daily or weekly basis from the present until some point in the future. Because the future rate of selling for each good is a key requirement for correctly calculating future good plans, the bottom-up planning system or bottom-up planning activity should find it is helpful to get the causal event information from the causal event calendar in order to make the most accurate determination of the future rate of selling for the good.

Top-down planning: Top down planning provides plans at levels higher than individual goods, but some differentiate historical discounting where the point of sale (POS) data does not fully capture the causal factors, particularly for the exogenous factors (e.g., selling during Pre-Mothers day is usually not differentiated other than by date in a POS where as type of promotion can be). In these instances it is helpful to have the causal calendar data available to the Top-down Planning system or system activities.

Open-to-buy (OTB) management: In OTB management, future inventory levels are predicted based on current inventory, expected selling, and expected receipts; the future inventory levels are then compared to budgeted levels in order to determine whether the current sales and ordering plan will result in exceeding the inventory budget (typically at the department level or higher). Because the future rate of selling is critical to calculating what future inventory levels will be, the OTB system or OTB activity should find it is helpful to get the causal event information from the causal event calendar in order to make the most accurate determination of the future rate of selling for an good.

Markdown management: A markdown management system or markdown activity within a system typically determines the optimal timing and level of markdowns of a seasonal or fashion program in order to sell the total purchased quantity by a predetermined "out date" while maximizing revenue. In order for a markdown management system to perform, it needs to query the causal event calendar in order to determine what event occur between the date of the markdown analysis and the "out date" in order to calculate the expected selling. For example, an good that has no event planned before its "out date" might require a markdown in order to reach full sell-through based on the rate of selling to-date; however, that same good with the same selling to-date may not require a markdown if some other event—a visual promotion, perhaps—is planned to take effect between the date of analysis and the "out date." Because the future likely rate of selling is critical to calculating what markdowns and markdown levels will be required, the Markdown system or Markdown activity should find it is helpful to get the causal event information from the causal event calendar in order to make the most accurate determination of what markdowns are best.

The systems or system activities discussed above may be further divided by types of goods, for example basic, fashion and seasonal goods. Therefore, you may have one distribution system or system activity for basic goods and another distribution system or system activity for fashion or seasonal goods. The example dimensions upon which the types of goods can be divided are described below:

Basic goods. Goods that are reorderable are frequently called basic and can use different mathematical calculations to determine how much to order, allocate or distribute than other types of goods.

Fashion/Seasonal goods. These goods are usually differentiated from basic goods in that they have limited or no ability to really be reordered once sales performance has been measured. The mathematical calculations to determine how much to order, allocate or distribute can differ by using historical sales profiles rather than specific good history.

Fashion goods. These goods can be further differentiated to goods that have no exact good history and therefore the mathematical calculations are based on historical profiles, in-season selling performance or a combination of the two.

Seasonal goods. These goods can also be further differentiated from fashion goods as having same good or very comparable good sales histories that however are discontinuous because the good is not sold year round. Therefore, the math may use that past good history and some combination of historical profiles and in-season selling performance.

In addition, there may be other differentiations of goods such as goods that are rapidly obsolete (e.g., computers with certain chip configurations) versus those with a longer sales life (e.g., printer supplies for multiple printers).

A multipurpose presentation demand calendar may allow users to enter the presentation demands in one place, use one approach, and have all the information assessable to all the systems or system activities from one table or set of tables. This increases the likelihood that goods will be handled the same way across multiple systems and that if a good moves from being basic to fashion that the user does not need to reenter information. It means that when a good is considered for markdown, if it has already been ordered, allocated and distributed and the presentation information has been entered, it is then available for the markdown activity. It also ensures that if a change is made in the past, present or future presentation calendar, it is effectively made for all the activities. If a single presentation event calendar were not maintained, then each system would need to maintain its own presentation event calendar or each system would not have the benefit of using future presentation information in order to make the best calculations possible. By establishing and maintaining a single presentation demand calendar that feeds all retail systems or retail activities that require the information, data entry burdens are reduced and consistency is increased.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. An improvement to a management decision support system, including a computer system having memory and resources, a retail demand forecasting program applying one or more forecasting approaches, running on the computer system and generating output, and a set of analysis programs running on the computer system which utilize the output to generate analytical reports that support retailing activities, the improvement comprising:
a presentation demand calendar stored in memory and utilized by the forecasting program to generate the output, said presentation demand calendar associating with a plurality of good-selling location pairs, data including a good identifier, a selling location identifier, one or more presentation quantities each associated with a start date and a stop date, and a presentation demand type selector that selects one of a plurality of alternative extents to which the good can be sold out of the presentation quantity between the start date and the stop date; and
a schedule stored in the memory of display fixtures, including fixture counts and fixture capacities in the plurality of locations, further including fixture identifiers for a plurality of fixture types and quantities of the fixtures present at particular selling locations;
wherein particular presentation events are associated with use of particular instances of display fixture types, identified using the fixture identifiers, to display particular items and at least some of the presentation quantity requirements utilized by the forecasting program are derived from the use of the particular instance of the display fixture type to display the particular items.

2. The improvement of claim 1, wherein the start date and the stop date are implicitly associated with a memory location in which the presentation quantity is stored.

3. The improvement of claim 1, wherein the start date and the stop date are explicitly stored.

4. The improvement of claim 1, wherein the start dates and stop dates for the one or more presentation quantities define non-overlapping periods.

5. The improvement of claim 1, wherein the start dates and stop dates for the one or more presentation quantities define overlapping periods.

6. The improvement of claim 1, wherein the good identifier associated with good-selling location pairs includes a good number and a good description.

7. The improvement of claim 1, further including a good description table associated with the good identifier.

8. The improvement of claim 1, wherein the selling location identifier associated with good-selling location pairs includes a selling location number and a selling location description.

9. The improvement of claim 1, further including a selling location description table associated with the selling location identifier.

10. The improvement of claim 1, wherein the set of analysis programs is adapted to basic retail goods.

11. The improvement of claim 1, wherein the set of analysis programs is adapted to seasonal retail goods.

12. The improvement of claim 1, wherein the set of analysis programs is adapted to fashion retail goods.

13. The improvement of claim 1, wherein the set of analysis programs operate on daily or more frequent period forecasts.

14. The improvement of claim 1, wherein the set of analysis programs operate on weekly forecasts.

15. The improvement of claim 1, wherein the additional analysis programs operate on pairings of individual goods in individual selling locations.

16. The improvement of claim 1, wherein the additional analysis programs report aggregated groups of goods in individual selling locations.

17. The improvement of claim 1, wherein the additional analysis programs report aggregated individual goods in groups of selling locations.

18. The improvement of claim 1, wherein the additional analysis programs report aggregated groups of goods in groups of selling locations.

19. The improvement of claim 1, wherein the analysis is displayed on a monitor in communication with the computer system.

20. The improvement of claim 1, wherein the analysis is saved in a spreadsheet file format.

21. The improvement of claim 1, wherein the analysis is printed on paper, microfiche or optical media.

22. The improvement of claim 1, wherein the analysis is distributed by email or other messaging facility.

23. The improvement of claim 1, wherein the analysis generated by the additional analysis programs is utilized as input to an additional process.

24. A computer-implemented method of generating reports from simulated unit inventory and unit sales on a bottom-up per location basis for a multitude of items at a plurality of locations, including:
modeling with a computer, with a presentation demand calendar, which is a data structure stored in computer readable memory, in said computer a plurality of retail presentation events having presentation demand types that have differing impacts on presentation quantity requirements,
wherein a presentation event data tuple for a retail presentation event in the presentation demand calendar includes at least
a good identifier for a good,
a selling location identifier for a selling location,
a presentation demand type selector, and
at least one presentation quantity associated with a start date and
a stop date for the retail presentation event;
eliciting from a user a setting for the presentation demand type selector for the retail presentation event, the setting representing one of a plurality of extents to which the good can be sold out of the presentation quantity between the start date and the stop date;
modeling with a schedule of display fixtures, which is a data structure stored in computer readable memory, fixtures and fixture capacities in the plurality of locations, the schedule of display fixtures including fixture identifiers for a plurality of fixture types and quantities of the fixtures present at particular selling locations;
associating particular presentation events with use of particular display fixture types to display particular items; and
deriving at least some of the presentation quantity requirements from the use of the particular display fixture types to display the particular items; and
forecasting unit inventory and unit sales at a per-item, per-location level using the presentation demand type selector, in combination with other data in the presentation event data tuple, to satisfy presentation quantity requirements during the presentation event;

generating, from results of the forecasting using the presentation demand calendar consistently across analytical tools, analytical reports that support retailing activities.

25. The method of claim 24, wherein the presentation demand type selector causes the presentation quantity used by the forecasting program to be the average presentation quantity for the location during a predetermined selling period.

26. The method of claim 24, wherein the presentation demand type selector causes the presentation quantity used by the forecasting program to be the presentation quantity for the selling location on the first day of a predetermined selling period.

27. The method of claim 24, wherein the presentation demand type setting causes the presentation quantity used by the forecasting program to be the presentation quantity on the day of a predetermined selling period when the good is received at the selling location.

28. The method of claim 24, wherein the presentation demand type selector causes the presentation quantity used by the forecasting program to be the largest presentation quantity associated with the good at the selling location for any day of a predetermined selling period.

29. The method of claim 24, wherein the presentation demand type selector causes the presentation quantity used by the forecasting program to be the larger of the presentation quantities or the projected demand requirements for the good at the selling locations.

30. The method of claim 24, wherein the presentation demand type selector causes the presentation quantity used by the forecasting program to be the presentation quantity for the selling location on the last day of a predetermined selling period.

* * * * *